(12) United States Patent
Kelly et al.

(10) Patent No.: US 12,181,029 B2
(45) Date of Patent: Dec. 31, 2024

(54) THREE POSITION GEAR SELECTION UNIT

(71) Applicants: EXEDY GLOBALPARTS CORPORATION, Belleville, MI (US); MEANS INDUSTRIES, INC., Saginaw, MI (US)

(72) Inventors: Cody Kelly, Ypsilanti, MI (US); Bryant Grytzelius, Canton, MI (US); Kenneth Walega, Northville, MI (US); Joshua Hand, Midland, MI (US); Ali Merat, Sausalito, CA (US); Spencer Kane, Chesaning, MI (US); Todd Andrzejewski, Saginaw, MI (US)

(73) Assignees: Exedy GlobalParts Corporation, Belleville, MI (US); Means Industries, Inc., Saginaw, MI (US)

( * ) Notice: Subject to any disclaimer, the term of this patent is extended or adjusted under 35 U.S.C. 154(b) by 0 days.

(21) Appl. No.: 18/548,052

(22) PCT Filed: May 1, 2023

(86) PCT No.: PCT/US2023/020557
§ 371 (c)(1),
(2) Date: Aug. 25, 2023

(87) PCT Pub. No.: WO2023/212395
PCT Pub. Date: Nov. 2, 2023

(65) Prior Publication Data
US 2024/0093764 A1 Mar. 21, 2024

Related U.S. Application Data

(60) Provisional application No. 63/336,962, filed on Apr. 29, 2022.

(51) Int. Cl.
*F16H 3/62* (2006.01)
*F16H 3/14* (2006.01)

(52) U.S. Cl.
CPC ............. *F16H 3/62* (2013.01); *F16H 3/14* (2013.01); *F16H 2200/0021* (2013.01)

(58) Field of Classification Search
CPC ....... F16H 3/62; F16H 3/14; F16H 2200/0021
(Continued)

(56) References Cited

U.S. PATENT DOCUMENTS 7,137,923 B2  11/2006  Tiesler et al.
8,657,717 B2   2/2014  Gumpoltsberger et al.
(Continued)

FOREIGN PATENT DOCUMENTS

CN    204061762 U    12/2014
WO    2018/095544 A1  5/2018

*Primary Examiner* — Colby M Hansen
(74) *Attorney, Agent, or Firm* — Honigman LLP; Eric J. Sosenko; Jonathan P. O'Brien

(57) ABSTRACT

A gear reduction unit for coupling the output member of a prime mover to the input member of a device that is to be driven thereby. The gear reduction unit includes an input shaft, an output shaft, a primary gear set arranged between the input shaft and the output shaft, a secondary gear set arranged between the input shaft and the output shaft, and a gear selection device. The gear selection device is configured to selectively and alternately couple the input shaft to the output shaft for driving thereof by one of the primary gear or the secondary gear set.

13 Claims, 3 Drawing Sheets

(58) Field of Classification Search
USPC .......................................................... 475/275
See application file for complete search history.

(56) References Cited

U.S. PATENT DOCUMENTS

| | | | |
|---|---|---|---|
| 10,781,920 B2 | 9/2020 | Kimes et al. | |
| 11,035,423 B2 | 6/2021 | Kimes | |
| 2009/0098970 A1* | 4/2009 | Kimes | F16H 3/725 |
| | | | 475/5 |
| 2010/0252384 A1* | 10/2010 | Eisengruber | F16D 41/14 |
| | | | 192/43.1 |
| 2015/0000442 A1 | 1/2015 | Kimes et al. | |
| 2023/0141381 A1 | 5/2023 | Voelker et al. | |

* cited by examiner

THREE POSITION GEAR SELECTION UNIT

CROSS-REFERENCE TO RELATED APPLICATIONS

This application is the U.S. national phase of PCT Application No. PCT/US2023/020557 filed on May 1, 2023, which claims priority to U.S. Application No. 63/336,962 filed on Apr. 29, 2022, the entire disclosures of which are incorporated by reference herein.

BACKGROUND

1. Field of the Invention

The present invention generally relates to gear reduction units. More specifically, the invention relates to a new architecture for a gear reduction unit, as may be used in the powertrain system of a motor vehicle or another driven device, that allows for selection between two gear sets.

2. Description of Related Art

Today, the automotive industry is increasingly moving away from internal combustion engines (ICE) as the power source of the vehicle and toward electric motors (EM) as sources of power. Hybrid vehicles (HV) offer a blend of an ICE vehicle and an all-electric vehicle. During use, hybrid vehicles alternate between the ICE and the EM for powering the vehicle.

Gear reduction units are mechanical transmission devices that connect the motor (e.g. ICE, EM, etc.) to a driven device. Gear reduction units allow the input speed from the motor to be reduced (lowered) to a slower output speed, but with the same or an increased amount of output torque. Such units find application in driven vehicles and particularly in electric vehicles.

Existing gear reduction units, such as those employed in electric vehicles, are systems that only operate in one gear state. In other words, the systems have a single gear and, therefore, employ a single gear reduction unit, which may or may not include multiple stages of reduction. Different operational speeds of the vehicle are therefore obtained by increasing or decreasing the rotational speed from the motor at the input shaft, which in turn increases or decreases the rotational speed of the output shaft from the gear reduction unit.

Furthermore, operating the electric vehicle in a forward direction is achieved by driving the input shaft in given rotational direction. To operate the electric vehicle in reverse or a rearward direction, the input shaft from the electric motor is rotationally driven in an opposite direction. In existing manual transmissions, the input shaft includes a single gear and synchronizers occur on the output shaft.

As seen from the above, these systems do not incorporate multiple forward gear states (first gear, second gear, etc.), a reverse gear state or a neutral gear state.

While the above discussion concerns the powertrains of vehicles, the output of the gear reduction unit itself may be coupled to other devices also having a need for a rotational input.

SUMMARY

In overcoming the drawbacks and other limitations of the known technologies, in one aspect the present invention provides an architecture whereby the input from a prime mover that is delivered to a driven device is switchable between different gear sets.

With the present invention, a gear reduction unit is provided with the ability to receive its input from a prime mover, such as an electric motor or internal combustion engine, via a direct drive connection or torque converter (indirect drive) connection and allow the input shaft of the gear reduction unit to rotate in a single direction while rotating the output shaft of the gear reduction unit in the same direction or a reversed/opposite direction; provide the gear reduction unit with an additional "neutral" position; and, alternatively, allow the input shaft of the gear reduction unit to be coupled between different gear ratios, i.e. a high gear ratio or a low gear ratio.

Accordingly, the invention provides a gear reduction unit for coupling the output member of a prime mover to the input member of a device to be driven thereby.

In another aspect, the gear reduction unit includes an input shaft, an output shaft, a primary gear set arranged between the input shaft and the output shaft, a secondary gear set arranged between the input shaft and the output shaft, and a gear selection device that selectively and alternately couples the input shaft to the output shaft for driving thereof by either the primary gear set or the secondary gear set.

In a further aspect, the gear selection device is a dynamically controllable clutch.

In an additional aspect, the dynamically controllable clutch is a three position dynamically controllable clutch.

In still another aspect, the primary gear set defines a first gear reduction and the secondary gear set defines a second gear reduction, the second gear reduction being different from the first gear reduction.

In yet a further aspect, the secondary gear set includes a driving gear, a driven gear and an idler gear.

In an additional aspect, the dynamically controllable clutch includes at least two strut retainers and a translator, the translator being moveable between engagement with one of the strut retainers for driving of the primary gear set and engagement with the other of the strut retainers for driving of the secondary gear set.

In yet another aspect, the strut retainers include pockets for receiving portions of the translator and include struts moveable engaged with respect to the pockets so as to extend into the pockets and be engaged by the translator when moved into engagement with the respective strut retainer.

In still a further aspect, the architecture includes a selectable switching device configured to be coupled to the output member of the prime mover, the selectable switching device being selectively and alternately coupled in one of a first state and a second state; a torque transfer device, the torque transfer device having a torque transfer device input member and a torque transfer device output member, the torque transfer device input member configured to be coupled to the selectable switching device in the first state; a direct drive member, the direct drive member configured to be coupled to the selectable switching device in the second state; a gear reduction unit, the gear reduction unit including an input shaft and an output member, the input shaft being coupled to the torque transfer device output member and driven in rotation thereby in the first state; the input shaft being coupled to the direct drive member and being driven in rotation thereby in the second state; and the gear reduction unit further including a primary gear set, a secondary gear set and a multi-position gear selection device, the gear selection device having at least first, second and third positions, in the first position the gear selection device coupling the primary gear set to the output member with the output member being driven by the primary gear set and not the secondary gear set, in the second position the gear selection device coupling the secondary gear set to the output member and the output member being driven by the secondary gear set and not the primary gear set, in the third position the gear selection device not coupling either of the primary and secondary gear sets to the output member and the output member not being driven by either of the primary or secondary gear sets.

In an additional aspect, the primary gear set is a first gear reduction and the secondary gear set is a second gear reduction.

In another aspect, the secondary gear set includes a driving gear, a driven gear and an idler gear.

In a further aspect, the gear selection device is a dynamically controllable clutch.

In an additional aspect, the output member of the gear selection unit is a countershaft.

In still another aspect, the counter shaft is drivingly coupled to the device to be driven.

In yet a further aspect, the device to be driven is one of an output shaft or a differential.

In an additional aspect, the torque transfer device is a torque converter.

Further objects, features and advantages of this invention will become readily apparent to persons skilled in the art after review of the following description, including the claims, and with reference to the drawings that are appended to and form a part of this specification.

DETAILED DESCRIPTION

Figure 1:
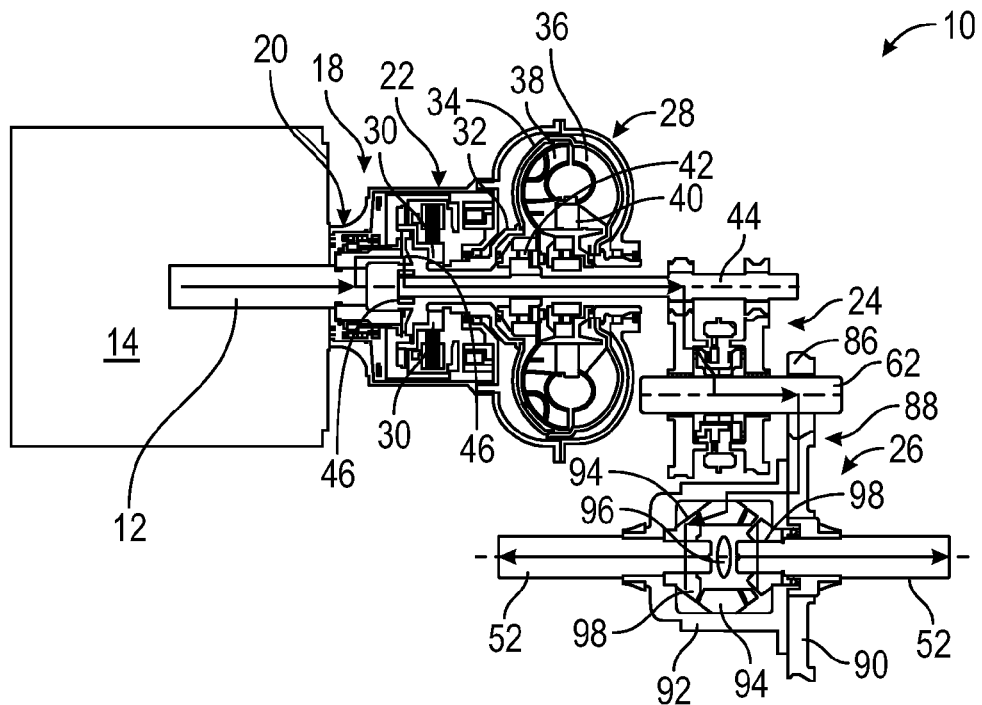
FIG. 1 is a schematic illustration of a powertrain system embodying the principles of the present invention and showing a power flow path through a gear reduction unit in a first gear selection position.
Figure 2:
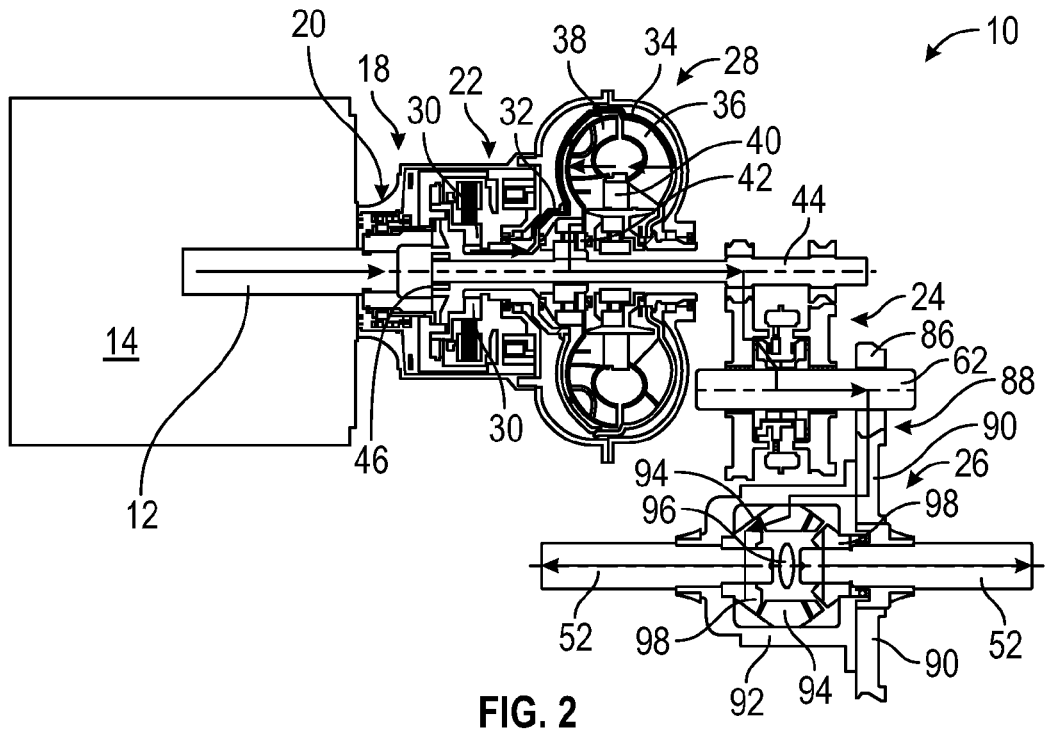
FIG. 2 is a schematic illustration of a powertrain system embodying the principles of the present invention and showing a second power flow path through the gear reduction unit in the first gear selection position.

A powertrain system is seen in FIGS. 1 and 2 that allows for alternate selection between two torque flow paths, 1) an indirect flow path utilizing a torque converter that drives the gear reduction unit and 2) a direct-drive flow path that completely bypasses the torque converter and directly drives a gear reduction unit of the architecture, which is configured for connecting to a device that is to be driven by the powertrain, such as a differential or a transmission. In the illustrated architecture, selecting between the two torque paths is achieved using a dynamically controlled clutch (DCC). The illustrated architecture allows for re-connecting and re-establishing of the indirect torque flow path, the flow path through the torque converter, throughout the operational speed range of the system by using an electric friction clutch (EFC). The EFC brings the rotational speed of the torque converter to within a specified speed differential with the prime mover (e.g. an electric motor or ICE), allowing the dynamic controllable clutch to re-establish the indirect torque flow path.

Referring now to the drawings, the powertrain system is shown therein and generally designated at 10. Torque is provided to the system 10 at an input member 12 from a prime mover 14 (e.g. an electric motor (EM), internal combustion engine (ICE), or other device) Torque is transferred from the input member 12 to a selectable switching device 18, which may incorporating both a dynamically controlled clutch 20 and an electric friction clutch 22. The switching device 18 in turn causes torque to be transmitted to a gear reduction unit 24 of the system 10. The output of the gear reduction unit 24 provides torque to the input of the driven device 26, which is shown a differential, but may be a transmission or other device. In transferring the torque, the switching device 18 can transmit the torque to the gear reduction unit 24 indirectly, through a torque converter 28, or directly, through mechanical connection completely bypassing the torque converter 28. Selection between the two torque paths is achieved using the dynamic controllable clutch 20 of the switching device 18.

As seen by the flow-path designated in FIG. 2, when transferring torque through the torque converter 28 in the indirect mode of operation, torque flows from the dynamic controllable clutch 20 through a connection element 30 to an input hub 32 of the torque converter 28. Thereafter, torque is transferred by way of the torque converter's shell 34 to an impeller 36. The impeller 36 is fluidly coupled with a turbine 38 and a stator 40 to multiply the torque. From the turbine 38, torque is transmitted to a one-way clutch 42, which will operate in a lock-up condition to drive a shaft 44 that is the input member of the gear reduction unit 24. The fluid coupling of the torque converter 28 is herein referred to as an indirect coupling in that a rigid, mechanical connection is not established thereby.

As seen by the flow-path designated in FIG. 1, when bypassing the torque converter 28 and transferring torque in the direct mode of operation, torque flows from the dynamic controllable clutch 20 to a direct drive connection element 46, which is coupled to the shaft 44 operating as the input member of the gear reduction unit 24. In the direct mode of operation, the connection element 30 is not driven and no torque is inputted into the torque converter 28. The one-way clutch 42 of the torque converter 28 operates in an over-running condition. Accordingly, no components of the torque converter 26 (input hub 32, shell 34, the impeller 36, turbine 38 or stator 40) are driven or rotate during direct mode operation and no losses occur as a result thereof.

Figure 3:
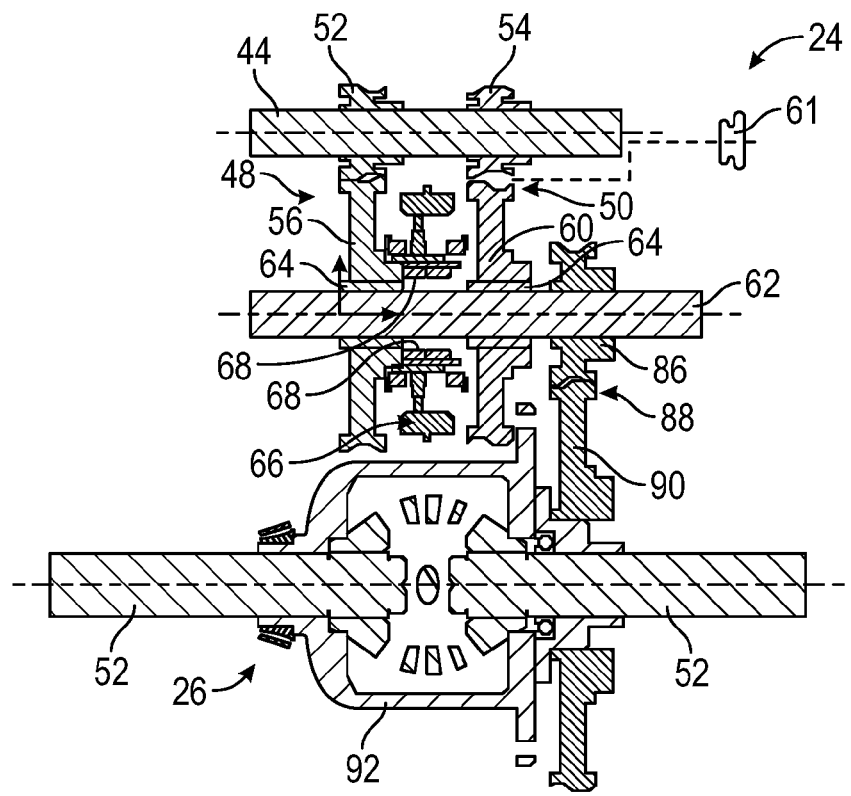
FIG. 3 is an enlarged schematic illustration of the gear reduction unit seen in FIGS. 1 and 2, but with the gear reduction unit in a second gear selection position.

As seen from FIGS. 1-3, the input shaft 44 of the gear reduction unit 24 is driven by the prime mover 14. The gear reduction unit 44 includes two gear sets, a primary gear set 48 and a secondary gear set 50, that may be alternately used to drive the input of a driven device 26. As depicted in the figures, the driven device 26 is a differential having output shafts 52 for connection to the wheels of an automotive vehicle.

Referring now to the enlarged depiction of the gear reduction unit 24, seen in FIG. 3, the respective driving gears 52, 56 of the primary and secondary gear sets 48, 50 are fixed to the input shaft 44 and, therefore rotate with the input shaft 44. The larger, driven gears 56, 60 of the primary and secondary gear sets 48, 50 are mounted on a layshaft/countershaft 62, via bearings or other means 64, so as to freely rotate relative to the layshaft/countershaft 62.

In the primary gear set 48, the driving gear 52 directly engages the driven gear 56. In the secondary gear set 50, the driving gear 54 directly engages the driven gear 60 or, alternatively, an idler gear 61 located between the driving gear 54 and the driven gear 60. In the former instance, the primary and secondary gear sets 48, 50 are different in that the respective driving gear and driven gear combinations provide the secondary gear set 50 with a different gear ratio than the primary gear set 48. In the latter instance, the inclusion of the idler gear causes the secondary gear set 50 to operate as a reverse gear.

Figure 4:
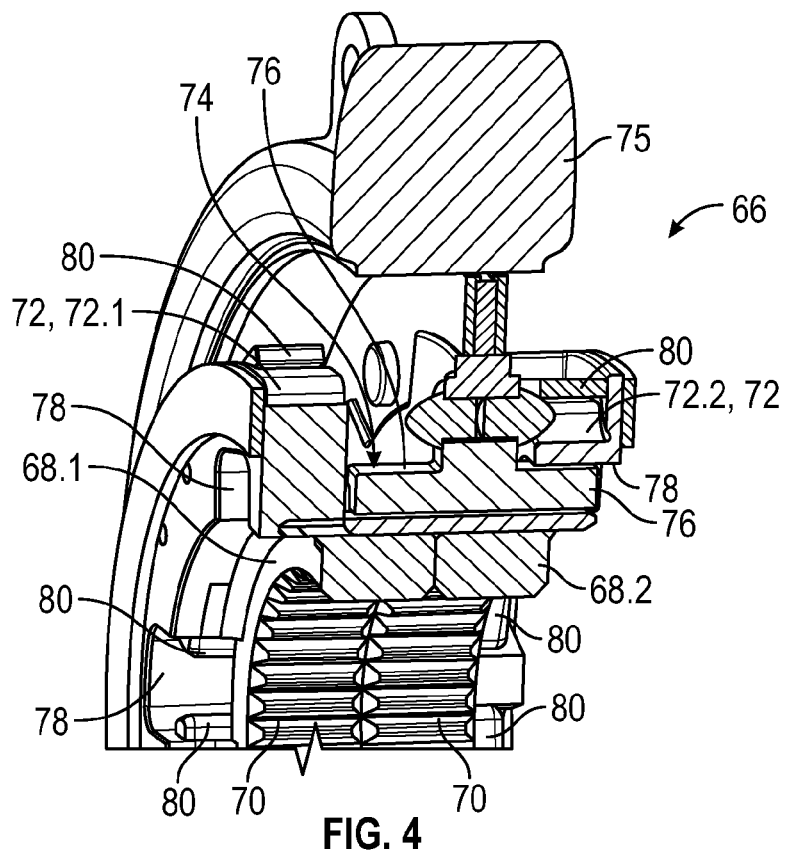
FIG. 4 is an enlarged, cut-away view of a portion of the gear reduction unit seen in FIG. 3.
Figure 5:
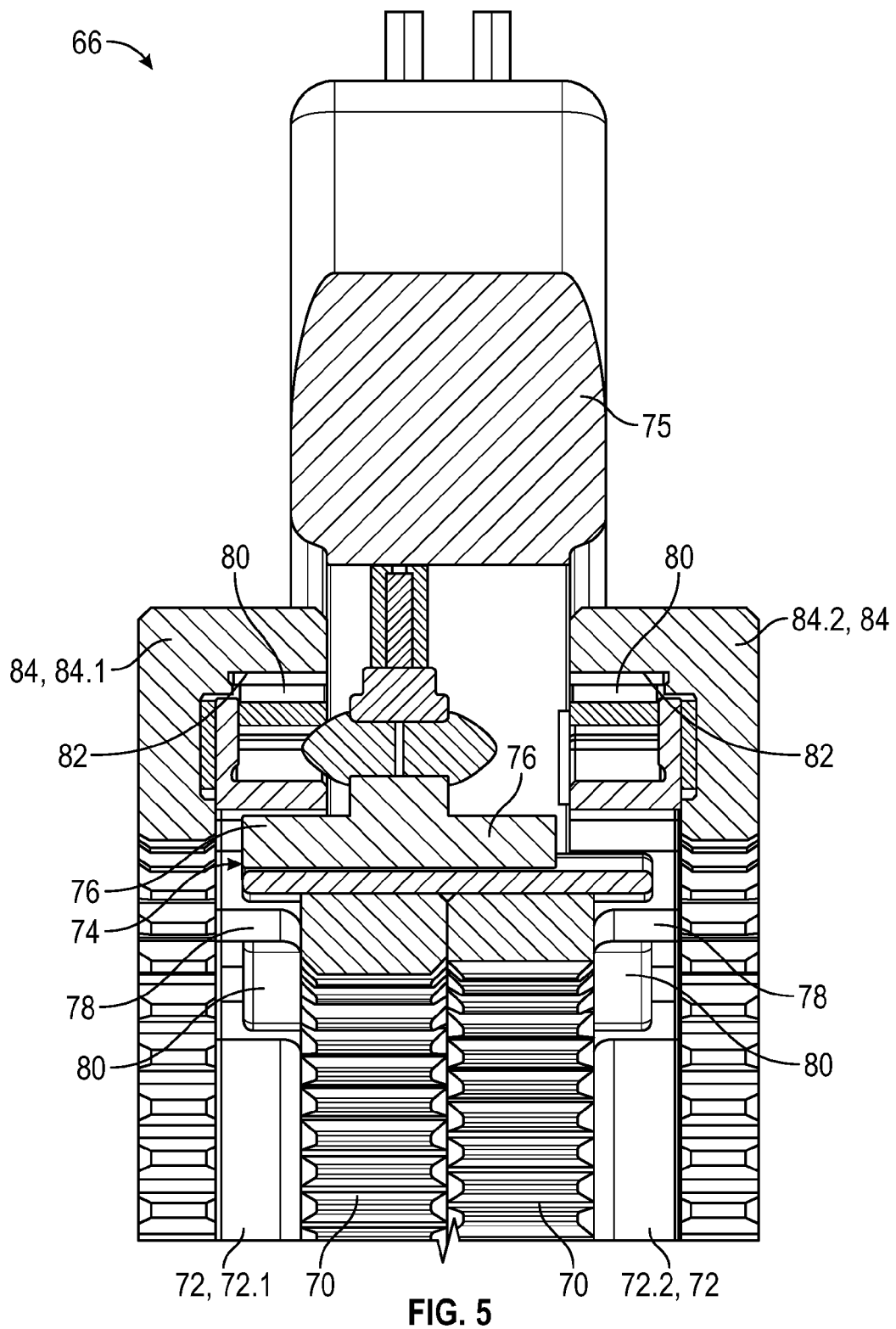
FIG. 5 is a cross-section al view of the portion of the gear reduction unit seen in FIG. 4.

To transfer torque to the layshaft/countershaft 62, a gear selection device 66 is located between the primary and secondary gear sets 48, 50. One preferred gear selection device 66 for this purpose is a 3-position dynamically controllable clutch. The dynamically controllable clutch 66, as shown in FIGS. 4 and 5, includes an output ring 68, which may be provided as a pair of output rings 68.1, 68.2, in fixed engagement on the layshaft/countershaft 62. This fixed engagement may be provided as a splined engagement through use of splines 70 provided on the interior diameter of the output ring 68.

About the output rings 68, or integrally formed therewith, are a pair of strut retainers 72.1, 72.2 and an axially moveable translator 74, which is located between the retainers 72.1, 72.2. Each strut retainer 72.1, 72.2 is associated with one of the large gears 56, 60 and, therefore, either the primary gear set 48 or the secondary gear set 50. An electronic coil 75 is also provided.

Activation of the coil 75 causes the translator 74 to be axially moved between three positions. In the first position, the translator 74 is engaged with the (first) strut retainer 72.1 that is associated with the driven gear 56 of the primary gear set 48. In the second position, the translator 74 is engaged with the (second) strut retainer 72.2 that is associated with the driven gear 60 of the secondary gear set 50. In a third position, the translator 74 is between the strut retainers 72.1, 72.2 and not engaged with either of the driven gears 56, 60.

When the translator 74 is in the first position and engaged with the first strut retainer 72.1, the connection between the input shaft 44 and the layshaft/countershaft 62, via the primary gear set 48, becomes rigid and the layshaft/countershaft 62 is driven according to the gear ratio of the primary gear set 48. In this instance, the driven gear 60 of the secondary gear set 50 is not drivingly connected to the layshaft/countershaft 62 and freely rotates relative to the layshaft/countershaft 62.

When the translator 74 is in the second position and engaged with the second strut retainer 72.2, the connection between the input shaft 44 and the layshaft/countershaft 62, via the secondary gear set 50, becomes rigid and the layshaft/countershaft 62 is driven according to the gear ratio of the secondary gear set 50. In this instance, the large gear 56 of the primary gear set 50 is not drivingly connect to the layshaft/countershaft 62 and freely rotates relative to the layshaft/countershaft 62.

To engage the strut retainers 72.1, 72.2 with the large gears 56, 60, the translator 74, includes on opposing sides, buttons 76, that are caused to extend into pockets 78 formed in the strut retainers 72.1, 72.2. In the pockets 78, the buttons 76 engage struts 80 held by the strut retainers 72.1, 72.2 and cause the struts 80 to pivot or slide out (radially or axially) out of the strut retainers 72.1, 72.2 and into engagement with notches, cut-outs or pockets 82 formed in plates 84, respectively secured to the large gears 56, 60, thereby rotationally locking the affected strut retainer 72.1, 72.2 with its respective large gear 56, 58. Preferably, the struts 80 are spring biased and, when the button 76 of the translator 74 is retracted by the coil 75, the strut 80 is biased by the spring back into the strut retainer 72, thereby disengaging the strut retainer 72 from the plate 84 and the respective large gear 56, 60. It will be appreciated that the plates 84 connected to the driven gears 56, 60, and engaged by the struts 80, can be integrated with the driven gears 56, 60 for a possible reduction in the axial packaging of the present assembly.

To provide the rotational output of the layshaft/countershaft 62 to the driven device 26, a driven (small) gear 86 of an output gear set 88 is fixed to the layshaft/countershaft 62. The driven gear 86 meshes with a driven (large) gear 90 of the output gear set 88. The driven gear 90 is fixed to the input of the driven device 26, such as the case 92 of a differential and drives the input/case 92 in rotation. With a differential as the driven device 26, a set of pinion gears 94 connected by a shaft 96 rotate in conjunction with the case 92 and causes rotation of the differential side gears 98, which output torque through the output shafts 52 to the wheels of the vehicle.

As will be appreciated, the driven device 26 may be the direct driving of the output shafts 52, with the differential being eliminated. Optionally, the output gear set 88 could be omitted and the layshaft/countershaft 62 used as a direct input to the driven device 26.

As seen from the above discussion, the gear selection device 66 allows for gear selection between two different gear sets, such as high and low gear sets or forward and reverse gear sets, along with selection of a neutral position.

The location of the gear select device 66 can be varied. For example, the gear select device 66 could be provided on the input shaft 44 between the driving gears 52, 54 or on the output shaft driven by the layshaft/countershaft 62. Additional the gear select devices 66 could be added to the configured to operate with gear sets in addition to the primary and secondary gear sets 48, 50, thereby allowing for a greater selection in the number of gear sets. These additional gear select device 66 could be located on the layshaft/countershaft 62 or on different shafts. Also, more than three positions could also be added to the gear select device 66.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:

1. A gear reduction unit for coupling an output member of a prime mover to an input member of a device to be driven thereby, the gear reduction unit comprising:
   an input shaft;
   an output shaft;
   a primary gear set arranged between the input shaft and the output shaft;
   a secondary gear set arranged between the input shaft and the output shaft; and
   a gear selection device, the gear selection device selectively and alternately coupling the input shaft to the output shaft for driving thereof by one of the primary gear set or the secondary gear set, the gear reduction unit being a dynamically controllable clutch that includes at least two strut retainers and a translator, the translator being moveable between engagement with one of the strut retainers for driving of the primary gear set and engagement with the other of the strut retainers for driving of the secondary gear set.

2. The gear reduction unit according to claim 1, wherein the dynamically controllable clutch is a three position dynamically controllable clutch.

3. The gear reduction unit according to claim 2, wherein the primary gear set defines a first gear reduction and the secondary gear set defines a second gear reduction, the second gear reduction being different from the first gear reduction.

4. The gear reduction unit according to claim 2, wherein the secondary gear set includes a driving gear, a driven gear and an idler gear.

5. The gear reduction unit according to claim 1, wherein the strut retainers include pockets for receiving portions of the translator and include struts moveable engaged with respect to the pockets so as to extend into the pockets and be engaged by the translator when moved into engagement with the respective strut retainer.

6. An architecture for coupling an output member of a prime mover to a device to be driven thereby, the architecture comprising:
   a selectable switching device configured to be coupled to the output member of the prime mover, the selectable switching device being selectively and alternately coupled in one of a first state and a second state;
   a torque transfer device, the torque transfer device having a torque transfer device input member and a torque transfer device output member, the torque transfer device input member configured to be coupled to the selectable switching device in the first state;
   a direct drive member, the direct drive member configured to be coupled to the selectable switching device in the second state;
   a gear reduction unit, the gear reduction unit including an input shaft and an output member, the input shaft being coupled to the torque transfer device output member and driven in rotation thereby in the first state; the input shaft being coupled to the direct drive member and being driven in rotation thereby in the second state; and
   the gear reduction unit further including a primary gear set, a secondary gear set and a multi-position gear selection device, the gear selection device having at least first, second and third positions, in the first position the gear selection device coupling the primary gear set to the output member with the output member being driven by the primary gear set and not the secondary gear set, in the second position the gear selection device coupling the secondary gear set to the output member and the output member being driven by the secondary gear set and not the primary gear set, in the third position the gear selection device not coupling either of the primary and secondary gear sets to the output member and the output member not being driven by either of the primary or secondary gear sets.

7. The architecture according to claim 6, wherein the primary gear set is a first gear reduction and the secondary gear set is a second gear reduction.

8. The architecture according to claim 6, wherein the secondary gear set includes a driving gear, a driven gear and an idler gear.

9. The architecture according to claim 6, wherein the gear selection device is a dynamically controllable clutch.

10. The architecture according to claim 6, wherein the output member of the gear selection unit is a countershaft.

11. The architecture according to claim 6, wherein the counter shaft is drivingly coupled to the device to be driven.

12. The architecture according to claim 6, wherein the device to be driven is one of an output shaft or a differential.

13. The architecture according to claim 6, wherein the torque transfer device is a torque converter.

* * * * *